United States Patent
Georgescu et al.

(10) Patent No.: US 9,990,445 B2
(45) Date of Patent: Jun. 5, 2018

(54) DECOUPLED PARALLEL MESHING IN COMPUTER AIDED DESIGN

(71) Applicant: Fujitsu Limited, Kawasaki (JP)

(72) Inventors: Serban Georgescu, London (GB); Peter Chow, Darland (GB); Makoto Sakairi, Kawasaki (JP); Hidehisa Sakai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1269 days.

(21) Appl. No.: 13/926,416

(22) Filed: Jun. 25, 2013

(65) Prior Publication Data
US 2014/0039847 A1    Feb. 6, 2014

(30) Foreign Application Priority Data
Jun. 25, 2012   (EP) .................................... 12173469

(51) Int. Cl.
| | |
|---|---|
| G06F 17/50 | (2006.01) |
| G06F 9/48 | (2006.01) |
| G06T 17/00 | (2006.01) |
| G06T 17/20 | (2006.01) |
| G06T 19/20 | (2011.01) |

(52) U.S. Cl.
CPC ............ *G06F 17/50* (2013.01); *G06F 9/4881* (2013.01); *G06F 17/5018* (2013.01); *G06F 17/5095* (2013.01); *G06T 17/005* (2013.01); *G06T 17/20* (2013.01); *G06T 19/20* (2013.01); *G06T 2219/2008* (2013.01)

(58) Field of Classification Search
CPC .. G06F 17/50; G06F 17/5018; G06F 17/5095; G06F 9/4881; G06T 2219/2008; G06T 19/20; G06T 1/20

USPC .......................... 703/1; 718/106; 700/97–98
See application file for complete search history.

(56) References Cited

U.S. PATENT DOCUMENTS

| | | | |
|---|---|---|---|
| 8,970,590 B1 * | 3/2015 | Brennan ................. | G06T 17/20 345/419 |
| 2006/0044309 A1 | 3/2006 | Kanai et al. | |
| 2006/0195678 A1 | 8/2006 | Jalobeanu | |
| 2007/0011646 A1 * | 1/2007 | Chrisochoides ........ | G06T 17/20 716/55 |

(Continued)

FOREIGN PATENT DOCUMENTS

JP          2012-118714          6/2012

OTHER PUBLICATIONS

Fougerolle et al. "Boolean Operations with Implicit and Parametric Representation of Primitives Using R-Functions". IEEE Transactions on Visualization and Computer Graphics, vol. 11, No. 5, Sep./Oct. 2005. p. 529-539.*

(Continued)

*Primary Examiner* — Eunhee Kim
(74) *Attorney, Agent, or Firm* — Staas & Halsey LLP

(57) ABSTRACT

In a meshing method for use in a computer-aided design (CAD) or computer-aided engineering (CAE) system, in which one or more serial meshing units are used to carry out a decoupled parallel meshing process in respect of all parts of a CAD assembly model, input parameters for the meshing process automatically, for each part to be processed, are set using live runtime information about the meshing process for the part concerned, such as information about the outcome of previous attempts to carry out the meshing process of the part.

5 Claims, 12 Drawing Sheets

(56) References Cited

U.S. PATENT DOCUMENTS

| | | |
|---|---|---|
| 2008/0238919 A1 | 10/2008 | Pack |
| 2008/0246766 A1* | 10/2008 | Yokohari ............... G06T 17/20 345/423 |
| 2009/0015586 A1 | 1/2009 | Im et al. |
| 2010/0134498 A1 | 6/2010 | Pirzadeh |

OTHER PUBLICATIONS

Qian et al. "Sharp Feature Preservation in Octree-Based Hexahedral Mesh Generation for CAD Assembly Models". 2010. p. 243-262.*

Hazer et al., "Automatic Generation of Individual Finite-Element Models for Computational Fluid Dynamics and Computational Structure Mechanics Simulations in the Arteries," AIP Conference Proceedings, 1148 (2009), pp. 133-136.

Huang et al., "Method for Adaptive Mesh Generation Based on Geometrical Features of 3D Solid," Chinese Journal of Mechanical Engineering, vol. 19, No. 3 (2006) pp. 330-334.

Löhner, "Automatic unstructured grid generators," Finite Elements in Analysis and Design 25 (1997) pp. 111-134.

European Patent Office Communication, including partial European Search Report, dated Mar. 25, 2013 in corresponding Application No. 12173469.3.

C. Saraceno et al., "Symmetrical Segmentation-Based Image Coding," *Proc. SPIE 2094* (*Visual Communications and Image Processing '93,*) vol. 2094, Nov. 1993, pp. 31-36.

S. Gottchalk et al., "OBB Tree: A Hierarchical Structure for Rapid Interference Detection," *Proc. SIGGRAPH '96*, Aug. 1996, pp. 171-180.

Y. Lu et al., "Volume Decomposition and Feature Recognition for Hexahedral Mesh Generation," *8th International Meshing Roundtable*, 1999, 12 pages.

P. Chow et al., "Putting Domain Decomposition at the Heart of a Mesh-Based Simulation Process," *International Journal for Numerical Methods in Fluids*, vol. 40, 2002, pp. 1471-1484.

A. Campos et al., "A Real-Time Expert System Architecture based on a Novel Dynamic Task Scheduling Technique," *Industrial Electronics Society Annual Conference (2002)*, vol. 3, Nov. 2002, pp. 1893-1898.

Japanese Office Action dated Mar. 14, 2017 in Japanese Patent Application No. 2013-133157.

* cited by examiner

Before CAD Split
1 solid

After CAD Split
6 solids (sections)

Overlap

DECOUPLED PARALLEL MESHING IN COMPUTER AIDED DESIGN

CROSS REFERENCE TO RELATED APPLICATIONS

This application claims the benefit of European Application No. 12173469.3, filed Jun. 25, 2012, the disclosure of which is incorporated herein by reference.

BACKGROUND OF THE INVENTION

The present invention relates to decoupled parallel meshing in computer-aided design (CAD), and in particular to methods, apparatus and programs for use at different stages of a decoupled parallel meshing process.

Computed Aided Engineering (CAE), the use of computer software for the purpose of modelling and simulating the behaviour of products in order to improve their quality, has become nearly ubiquitous in the manufacturing industry. Areas covered by CAE include, but are not limited to, stress and thermal analysis, fluid dynamics and kinematics.

As shown in FIG. 1 of the accompanying drawings, a typical CAE process starts with a Computer Aided Design (CAD) file which represents the geometrical model of the object that is analyzed (step 1). The CAD file, created using specialized CAD software, passes first through a stage at which boundary conditions are set (step 2) and then through a pre-processing step (step 3) where the geometry is partitioned (meshed) by a mesher into a very large number of elements, which form what is called a mesh. The mesh, accompanied by the boundary conditions, is then sent to a solver which uses standard numerical techniques, like the Finite Element Method, to compute the effect (e.g. deformation) of the boundary conditions on the object (step 4). Finally, the results are visualized in a post-processing step (step 5). Although the solver step used to be the most time consuming step of the analysis, with the improvement in processing power that has happened in the last few decades, the balance has shifted in the direction of the pre-processing operations, like CAD model preparation, the setting of boundary conditions and meshing. One of the main reasons for this shift is that, for complex CAD models, like the ones found in industry, a certain amount of user intervention is still required. As the processor performance is expected to follow this trend at least in the near future, pre-processing is set to become a bigger and bigger bottleneck in the analysis. Additionally, much less effort has hitherto been spent in automating and parallelizing these tasks than it was in the case of solvers. However, accelerating the pre-processing stage of the CAE process would be an important step towards achieving a faster and more efficient product development cycle and the development of better quality products.

Currently available meshers can be divided into two categories, serial and parallel. Serial meshers are restricted to the computational power of only one processor and to the memory attached to it. With a mesh of the order of 1 million elements requiring in the order of 1 GB of memory to create, it is clear that memory is a severe limitation for such codes. Moreover, with all modern processors having multiple cores, serial meshers are able to use less and less of the peak performance of the processor. However, most meshing software available today and, in particular, all those that are freely available (e.g. Netgen™, TetGen™, Gmsh™), fall into the serial mesher category.

Parallel meshers are able to create much larger meshes, and in a much shorter time, by distributing the workload to a number of processors found either in one computer or, more often, in a number of computers connected by a network. By the amount of communication performed between the processors while meshing, parallel mesh generators can be further divided into three categories: tightly coupled, loosely coupled and decoupled. From these three subcategories, only decoupled meshers (which require no communication or synchronization between different processing parts) can achieve 100% reuse of the serial meshing code. This is achieved by partitioning the domain that is to be meshed into a number of disjoint sub-domains, which are then independently meshed.

Two types of parallel-decoupled meshers have been proposed in the prior art. The first and most popular type, such as that disclosed in US2010134498A1, starts with a coarse two-dimensional (2D) surface mesh, created in serial. This initial mesh is partitioned into a number of sub-domains, with a three-dimensional (3D) volume mesh for each sub-domain being computed independently and in parallel on different nodes. The main drawback of this approach is that, for complex geometries, coarse meshes are in general more difficult to create than fine ones, since the small features of the geometry are more easily approximated by small elements rather than large ones. Hence, for complex geometries, the initial 2D mesh will need to be fine rather than coarse, which will become a major bottleneck of the algorithm. The second type, mentioned in US2007011646A1, works by starting with the partitioning of a single solid directly at the geometry level. However, this document describes the operation at an abstract level and does not give any way in which it can be actually implemented.

Another important issue which has not been addressed in any prior art so far is the fact that many CAD models which need to be meshed are not one single solid, but actually an assembly of multiple solids, ranging from a few tens (e.g., for a mobile phone) to hundreds (e.g. for a laptop computer) and to thousands (e.g. for a complete server). High-end commercial CAE packages like ABAQUS/CAE™ extract the parts from the assembly structure then mesh them, in sequence, as independent solids. As such, many opportunities for parallelism are lost. For example, the partitioning of the CAD model for one of the parts, a serial operation if considering that part in isolation, could be computed in parallel with the partitioning or meshing of other parts, which would reduce the overall time needed to mesh the assembly model.

Finally, most standard off-the-shelf meshers and in special free open-source ones, while able to generate high quality meshes, lack many automation features, in the sense that it is the user that must set certain key parameters, like the maximum element size. Meshing complex models is thus a time consuming trial-and-error process, with the user trying various values for the parameters (e.g. reducing the maximum element size) until the mesh is successfully obtained.

Accordingly it is desirable to provide a system that, in combination with an unmodified off-the-shelf serial meshing program and an unmodified off-the-shelf CAD kernel, can serve as a fast and scalable tool capable of meshing complex CAD models, like the ones used in industry, with relatively little or no user intervention.

SUMMARY OF THE INVENTION

According to an embodiment of a first aspect of the present invention there is provided a meshing method for use in a computer-aided design (CAD) or computer-aided engineering (CAE) system, in which one or more serial meshing units are used to carry out a decoupled parallel meshing process in respect of all parts of a CAD assembly model, characterised by setting input parameters for the meshing process automatically, for each part to be processed, using live runtime information about the meshing process for the part concerned.

The live runtime information preferably comprises information about the outcome of previous attempts to carry out the meshing process of the part.

Automatically setting the input parameters may comprise provisionally selecting the parameters for each part using live runtime information about the meshing process for the part concerned and subsequently, for each part for which there is a known dependency requirement between an input parameter for the part and an input parameter for at least one other part of the assembly model, determining if a provisionally selected parameter for the part or a provisionally selected parameter for the at least one other part is inconsistent with the dependency requirement and, if so, adjusting the provisionally selected parameter for the part and/or the provisionally selected parameter for the at least one other part to meet the dependency requirement.

In such a method where a part of an assembly model is split into sections prior to undergoing a CAD meshing process, wherein a volume of each section obtained must not exceed a maximum permitted volume, the method may further comprise, if the volume of the part exceeds the maximum permitted volume, considering the part to be the first section and then carrying out the steps of: (a) determining the principal axis of inertia A of the section; (b) determining the centre of gravity of the section; (c) defining first and second solid boxes whose intersection is one face that passes through the centre of gravity and is perpendicular to A and whose union is the entire bounding box of the section; (d) performing a CAD Boolean operation of the section and the first box, and a CAD Boolean operation of the section and the second box, to obtain respective intermediate sections; and (e) if the volume of a section obtained in step (d) exceeds the maximum permitted volume, repeating steps (b) to (d) for each of the sections obtained in step (d) until final sections having volumes which do not exceed the maximum permitted volume are obtained.

In this case the method preferably comprises carrying out, after a part of a CAD assembly model has been split into a desired number DN of final sections, a modification process, for all final sections $S_i$ of a part, where i=2 to DN, which modification process comprises: setting C=$S_i$ and, for all sections $S_j \neq S_i$ which have an interface with section $S_i$, performing CAD Boolean operation F=Fuse(C, $S_j$) and CAD Boolean operation C=Common(F, $S_i$), whereby opposing surfaces at interfaces between adjoining sections are modified so as to have identical geometry.

A method embodying the first aspect of the present invention may further comprise modifying a two dimensional (2D) mesh at a surface of a section obtained in a computer-aided design process in which an assembly model which is the subject of the CAD process has been separated into different parts each of which is split into sections which are then subjected to 2D meshing such that each surface of the section is defined by a set of 2D elements produced using a meshing method which generates the same one dimensional (1D) edge mesh at every surface, in which method the modifying comprises for all sections for which the method has not already been carried out and which have an interface with another section: matching nodes of elements along edges of a surface of a section on one side of the interface with nodes of elements along edges of an opposing surface of a section on the other side of the interface; and replacing the elements on the surface on one side of the interface with the elements on the surface on the other side of the interface.

In a method in which a part of a CAD assembly model is split into a desired number DN of sections prior to undergoing a CAD meshing process, the method may further comprise the steps of: (a) determining (i) the number of split points Nx in an X direction, (ii) the number of split points Ny in a Y direction and (iii) the number of split points Nz in a Z direction, where the X, Y and Z directions are mutually parallel and $(Nx+1)(Ny+1)(Nz+1) \geq DN$; (b) recursively bisecting the part in the X direction until (Nx+1) sections are obtained; (c) for all sections obtained in step (b), recursively bisecting the sections in the Y direction until (Nx+1)(Ny+1) sections are obtained; and (d) for all sections obtained in step (c), recursively bisecting the sections in the Z direction until (Nx+1)(Ny+1)(Nz+1) sections are obtained.

In this case the method may further comprise modifying a two dimensional (2D) mesh at a surface of a section obtained in a computer-aided design process in which an assembly model which is the subject of the CAD process has been separated into different parts each of which is split into sections which are then subjected to 2D meshing such that each surface of the section is defined by a set of 2D elements produced using a meshing method which generates the same one dimensional (1D) edge mesh at every surface, in which method the modifying comprises: allocating all the sections of the part to either a first set or a second set according to the location of the section in the part such that all the sections which have an interface with the sections in the first set are allocated to the second set; for each of the sections in the first set, matching nodes of elements along edges of a surface of a section in the first set with nodes of elements along edges of an opposing surface of a section in the second set; and replacing the elements on the surface of the first set section with the elements on the surface on the second set section.

According to an embodiment of a second aspect of the present invention there is provided meshing apparatus for use in a computer-aided design (CAD) or computer-aided engineering (CAE) system, which apparatus is configured to use one or more serial meshing units to carry out a decoupled parallel meshing process in respect of all parts of a CAD assembly model, characterised by a meshing parameter setting unit configured to set input parameters for the meshing process automatically, for each part to be processed, the meshing parameter setting unit being operable to use live runtime information about the meshing process for the part concerned to determine one or more input parameters.

The live runtime information comprises information about the outcome of previous attempts to carry out the meshing process of the part.

Apparatus embodying the second aspect of the present invention may further comprise a CAD splitting module configured to split a part of an assembly model into sections prior to CAD meshing of the sections, such that a volume of each section obtained does not exceed a maximum permitted volume, the CAD splitting module being operable, if the volume of the first section exceeds the maximum permitted volume, to consider the part to be the first section and then to carry out the steps of: (a) determining the principal axis of inertia A of the section; (b) determining the centre of gravity of the section; (c) defining first and second solid boxes whose intersection is one face that passes through the centre of gravity and is perpendicular to A and whose union is the entire bounding box of the section; (d) performing a CAD Boolean operation of the section and the first box, and a CAD Boolean operation of the section and the second box, to obtain respective intermediate sections; and (e) if the volume of a section obtained in step (d) exceeds the maximum permitted volume, repeating steps (b) to (d) for each of the sections obtained in step (d) until final sections having volumes which do not exceed the maximum permitted volume are obtained.

In such apparatus the CAD splitting module may be operable, after a part of a CAD assembly model has been split into a desired number DN of final sections, to carry out a modification process, for all final sections Si of a part, where i=2 to DN, comprising setting C=Si and, for all sections Sj≠Si which have an interface with section Si, performing CAD Boolean operation F=Fuse(C, Sj) and CAD Boolean operation C=Common(F, Si), whereby opposing surfaces at interfaces between adjoining sections are modified so as to have identical geometry.

Apparatus embodying the second aspect of the present invention may further comprise a mesh modification module configured to modify a two dimensional (2D) mesh at a surface of a section obtained in a computer-aided design process, where an assembly model which is the subject of the CAD process has been separated into different parts each of which is split into sections which are then subjected to 2D meshing such that each surface of the section is defined by a set of 2D elements produced using a meshing method which generates the same one dimensional (1D) edge mesh at every surface, the module being operable to carry out a method, for all sections for which the method has not already been carried out and which have an interface with another section, in which nodes of elements along edges of a surface of a section on one side of the interface are matched with nodes of elements along edges of an opposing surface of a section on the other side of the interface, and the elements on the surface on one side of the interface are replaced with the elements on the surface on the other side of the interface.

Apparatus embodying the second aspect of the present invention may further comprise a CAD splitting module configured to split a part of an assembly model into a desired number DN of sections prior to meshing of the sections, which module is operable to carry out the steps of: (a) determining (i) the number of split points Nx in an X direction, (ii) the number of split points Ny in a Y direction and (iii) the number of split points Nz in a Z direction, where the X, Y and Z directions are mutually parallel and (Nx+1)(Ny+1)(Nz+1)≥DN; (b) recursively bisecting the part in the X direction until (Nx+1) sections are obtained; (c) for all sections obtained in step (b), recursively bisecting the sections in the Y direction until (Nx+1)(Ny+1) sections are obtained; and (d) for all sections obtained in step (c), recursively bisecting the sections in the Z direction until (Nx+1)(Ny+1)(Nz+1) sections are obtained.

Such apparatus may further comprise a mesh modification module configured to modify a two dimensional (2D) mesh at a surface of a section obtained in a computer-aided design process, where an assembly model which is the subject of the CAD process has been separated into different parts each of which is split into sections which are then subjected to 2D meshing such that each surface of the section is defined by a set of 2D elements produced using a meshing method which generates the same one dimensional (1D) edge mesh at every surface, the module being operable to carry out a method in which: all the sections of the part are allocated to either a first set or a second set according to the location of the section in the part such that all the sections which have an interface with the sections in the first set are allocated to the second set; for each of the sections in the first set, nodes of elements along edges of a surface of a section in the first set are matched with nodes of elements along edges of an opposing surface of a section in the second set; and the elements on the surface of the first set section are replaced with the elements on the surface on the second set section.

According to an embodiment of a third aspect of the present invention there is provided a scheduling method for managing the execution of tasks in a decoupled parallel meshing process, in which the execution of one or more tasks may be dependent upon the execution result of at least one other task, and each task is scheduled for execution after the execution result of at least one of the tasks upon which it depends is known and processing resources for the task are available, wherein execution of one or more tasks is prioritised over one or more other tasks in accordance with a prioritisation criterion, the prioritisation criterion being, depending on a characteristic of the task, either that, on the basis of information relating to one or more previous attempts to execute the task or similar tasks, the task is deemed to be more likely to succeed than other tasks to be executed, or that, on the basis of information relating to one or more previous attempts to execute the task or similar tasks, the task is deemed to be more likely to fail than other tasks to be executed.

According to an embodiment of a fourth aspect of the present invention there is provided scheduling apparatus configured to manage the execution of tasks in a decoupled parallel meshing process, in which the execution of one or more tasks may be dependent upon the execution result of at least one other task, and each task is scheduled for execution after the execution result of at least one of the tasks upon which it depends is known and processing resources for the task are available, which apparatus is operable to prioritise execution of one or more tasks over one or more other tasks in accordance with a prioritisation criterion, the prioritisation criterion being, depending on a characteristic of the task, either that, on the basis of information relating to one or more previous attempts to execute the task or similar tasks, the task is deemed to be more likely to succeed than other tasks to be executed, or that, on the basis of information relating to one or more previous attempts to execute the task or similar tasks, the task is deemed to be more likely to fail than other tasks to be executed.

According to an embodiment of a fifth aspect of the present invention there is provided a recursive bisection method for use in computer-aided design (CAD), in which method a part of an assembly model is split into sections prior to undergoing a CAD meshing process, wherein a volume of each section obtained must not exceed a maximum permitted volume, characterised in that the method comprises, if the volume of the first section exceeds the maximum permitted volume, considering the part to be the first section and then carrying out the steps of: (a) determining the principal axis of inertia A of the section; (b) determining the centre of gravity of the section; (c) defining first and second solid boxes whose intersection is one face that passes through the centre of gravity and is perpendicular to A and whose union is the entire bounding box of the section; (d) performing a CAD Boolean operation of the section and the first box, and a CAD Boolean operation of the section and the second box, to obtain respective intermediate sections; and (e) if the volume of a section obtained in step (d) exceeds the maximum permitted volume, repeating steps (b) to (d) for each of the sections obtained in step (d) until final sections having volumes which do not exceed the maximum permitted volume are obtained.

According to an embodiment of a sixth aspect of the present invention there is provided apparatus for use in a computer-aided design (CAD) system, in which a recursive bisection method is used to split a part of an assembly model into sections prior to undergoing a CAD meshing process, such that a volume of each section obtained must not exceed a maximum permitted volume, wherein the apparatus is operable, if the volume of the first section exceeds the maximum permitted volume, to consider the part to be first section and to carry out the steps of: (a) determining the principal axis of inertia A of the section; (b) determining the centre of gravity of the section; (c) defining first and second solid boxes whose intersection is one face that passes through the centre of gravity and is perpendicular to A and whose union is the entire bounding box of the section; (d) performing a CAD Boolean operation of the section and the first box, and a CAD Boolean operation of the section and the second box, to obtain respective intermediate sections; and (e) if the volume of a section obtained in step (d) exceeds the maximum permitted volume, repeating steps (b) to (d) for each of the sections obtained in step (d) until final sections having volumes which do not exceed the maximum permitted volume are obtained.

According to an embodiment of a seventh aspect of the present invention there is provided a method for use in a computer-aided design (CAD) system, after a part of a CAD assembly model has been split into a desired number DN of final sections using a recursive bisection method, the method comprising carrying out, for all final sections Si of a part, where i=2 to DN: setting C=Si and, for all sections Sj≠Si which have an interface with section Si, performing CAD Boolean operation F=Fuse(C, Sj) and CAD Boolean operation C=Common(F, Si), whereby opposing surfaces at interfaces between adjoining sections are modified so as to have identical geometry.

According to an embodiment of an eighth aspect of the present invention there is provided apparatus for use in a computer-aided design (CAD) system, which module is characterised by being operable, after a part of a CAD assembly model has been split into a desired number DN of final sections using a recursive bisection method, to carry out a modification process, for all final sections Si of a part, where i=2 to DN, comprising: setting C=Si and, for all sections Sj≠Si which have an interface with section Si, performing CAD Boolean operation F=Fuse(C, Sj) and CAD Boolean operation C=Common(F, Si), whereby opposing surfaces at interfaces between adjoining sections are modified so as to have identical geometry.

According to an embodiment of a ninth aspect of the present invention there is provided a method of modifying a two dimensional (2D) mesh at a surface of a section obtained in a computer-aided design (CAD) process, where an assembly model which is the subject of the CAD process has been separated into different parts each of which is split into sections which are then subjected to 2D meshing such that each surface of the section is defined by a set of 2D elements produced using a meshing method which generates the same one dimensional (1D) edge mesh at every surface, the method being characterised by: for all sections for which the method has not already been carried out and which have an interface with another section: matching nodes of elements along edges of a surface of a section on one side of the interface with nodes of elements along edges of an opposing surface of a section on the other side of the interface; and replacing the elements on the surface on one side of the interface with the elements on the surface on the other side of the interface.

According to an embodiment of a tenth aspect of the present invention there is provided apparatus for modifying a two dimensional (2D) mesh at a surface of a section obtained in a computer-aided design (CAD) process, where an assembly model which is the subject of the CAD process has been separated into different parts each of which is split into sections which are then subjected to 2D meshing such that each surface of the section is defined by a set of 2D elements produced using a meshing method which generates the same one dimensional (1D) edge mesh at every surface, characterised in that the apparatus is operable to perform a method, for all sections for which the method has not already been carried out and which have an interface with another section, in which: nodes of elements along edges of a surface of a section on one side of the interface are matched with nodes of elements along edges of an opposing surface of a section on the other side of the interface; and the elements on the surface on one side of the interface are replaced with the elements on the surface on the other side of the interface.

According to an embodiment of an eleventh aspect of the present invention there is provided a recursive bisection method for use in a computer-aided design (CAD) process, in which method a part of a CAD assembly model is split into a desired number DN of sections prior to undergoing a CAD meshing process, characterised by the steps of: (a) determining (i) the number of split points Nx in an X direction, (ii) the number of split points Ny in a Y direction and (iii) the number of split points Nz in a Z direction, where the X, Y and Z directions are mutually parallel and (Nx+1)(Ny+1)(Nz+1)≥DN; (b) recursively bisecting the part in the X direction until (Nx+1) sections are obtained; (c) for all sections obtained in step (b), recursively bisecting the sections in the Y direction until (Nx+1)(Ny+1) sections are obtained; and (d) for all sections obtained in step (c), recursively bisecting the sections in the Z direction until (Nx+1)(Ny+1)(Nz+1) sections are obtained.

According to an embodiment of a twelfth aspect of the present invention there is provided apparatus for use in a computer-aided design (CAD) process, in which a recursive bisection method is used to split a part of a CAD assembly model into a desired number DN of sections prior to undergoing a CAD meshing process, wherein the apparatus is operable to perform the steps of: (a) determining (i) the number of split points Nx in an X direction, (ii) the number of split points Ny in a Y direction and (iii) the number of split points Nz in a Z direction, where the X, Y and Z directions are mutually parallel and (Nx+1)(Ny+1)(Nz+1)≥DN; (b) recursively bisecting the part in the X direction until (Nx+1) sections are obtained; (c) for all sections obtained in step (b), recursively bisecting the sections in the Y direction until (Nx+1)(Ny+1) sections are obtained; and (d) for all sections obtained in step (c), recursively bisecting the sections in the Z direction until (Nx+1)(Ny+1)(Nz+1) sections are obtained.

According to an embodiment of a thirteenth aspect of the present invention there is provided a method of modifying a two dimensional (2D) mesh at a surface of a section obtained in a computer-aided design (CAD) process, where an assembly model which is the subject of the CAD process has been separated into different parts each of which is split into sections which are then subjected to 2D meshing such that each surface of the section is defined by a set of 2D elements produced using a meshing method which generates the same one dimensional (1D) edge mesh at every surface, the method being characterised by: allocating all the sections of the part to either a first set or a second set according to the location of the section in the part such that all the sections which have an interface with the sections in the first set are allocated to the second set; for each of the sections in the first set, matching nodes of elements along edges of a surface of a section in the first set with nodes of elements along edges of an opposing surface of a section in the second set; and replacing the elements on the surface of the first set section with the elements on the surface on the second set section.

According to an embodiment of a fourteenth aspect of the present invention there is provided apparatus for modifying a two dimensional (2D) mesh at a surface of a section obtained in a computer-aided design (CAD) process, where an assembly model which is the subject of the CAD process has been separated into different parts each of which is split into sections which are then subjected to 2D meshing such that each surface of the section is defined by a set of 2D elements produced using a meshing method which generates the same one dimensional (1D) edge mesh at every surface, characterised in that the apparatus is operable to: allocate all the sections of the part to either a first set or a second set according to the location of the section in the part such that all the sections which have an interface with the sections in the first set are allocated to the second set; for each of the sections in the first set, match nodes of elements along edges of a surface of a section in the first set with nodes of elements along edges of an opposing surface of a section in the second set; and replace the elements on the surface of the first set section with the elements on the surface on the second set section.

According to a fifteenth aspect of the present invention, there is provided a computer-readable medium carrying instructions which, when carried out on a computer, cause that computer to carry out a method embodying the first, third, fifth, seventh, ninth, eleventh or thirteenth aspect of the present invention or to become apparatus embodying the second, fourth, sixth, eighth, tenth, twelfth or fourteenth aspect of the present invention.

As compared to the technology described in US2007011646A1, which consists of a way of achieving parallel meshing based on the domain decomposition approach, aspects of the present invention provide a feasible implementation of the decoupled domain decomposition method based on CAD operations (which in US2007011646A1 is only described at an abstract level), extension to assembly models and the added level of parallelism resulting from dealing with such models, and automation for finding the best meshing parameters.

As compared to the parallelization approach applied in all parallel meshers presently available on the market, which are the same as or similar to that described in US2010134498A1, in aspects of the present invention the domain decomposition starts directly from the CAD and not from an initial coarse 2D surface mesh of the model. Starting from a 2D mesh is not scalable for complex CAD models such as the ones found in industry because of the difficulty in creating the initial 2D mesh. The approach offered by aspects of the present invention offers a much better scalability. Moreover, aspects of the present invention can allow an extension to assembly models and the added level of parallelism resulting from dealing with such models, while the prior art, although able to support assembly models, only deals with one single solid at a time The applicant is not aware of any free mesher available in the public domain which is parallel and which has automation features. By combining an embodiment of the present invention with such a free mesher (e.g. Gmsh™, Netgen™) and a free CAD Engine (e.g. Open Cascade™), it is possible to obtain a low-cost system with the following added advantages:

Support for meshing assembly models, which are not supported by such meshers

Automation, for example the automatic setting of meshing parameters such as the maximum element size Faster meshing time, since more processing units are used at the same time Lower memory usage, since large CAD models are first split into smaller sections that require much less memory to mesh. This allows very large meshes (e.g. hundreds of millions of elements or even more) to be created on machines with limited resources (e.g. desktop computers and even laptops)

Moreover, as compared to commercial meshers, an embodiment of the present invention can provide the following advantages:

More efficient meshing of assembly models, since a system embodying the present invention is able to mix and overlap the execution of the meshing operations for the whole assembly model, which is much more efficient than meshing each part in isolation as it is done by current technology Reduced cost since much of the functionality of complex commercial meshers can be obtained using free components Increased scalability, owing to use of the CAD-based domain decomposition proposed in the embodiment (as described above, current technologies start with creating a coarse 2D mesh which, for complex models as the one found in industry, quickly becomes a bottleneck)

Lower memory usage, since large CAD models are first split into smaller sections that require much less memory to mesh. This allows very large meshes (e.g. hundreds of millions of elements or even more) to be created on machines with limited resources (e.g. desktop computers and even laptops)

BRIEF DESCRIPTION OF THE DRAWINGS

Reference will now be made, by way of example, to the accompanying drawings in which:

FIG. 21 illustrates a mesh assembly module;
and FIG. 22 illustrates a Parallel Task Scheduling module.

DETAILED DESCRIPTION OF THE PREFERRED EMBODIMENTS

Before describing an embodiment which brings together the different aspects of the present invention, the terms used in the present application will now be defined.

Assembly Model

Figure 1:
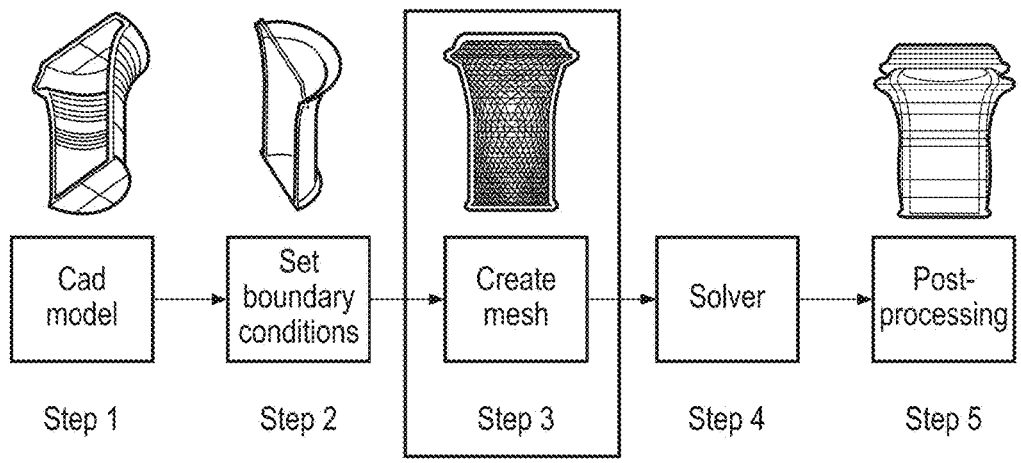
FIG. 1 (described above) is a flowchart of a CAE process.
Figure 2:
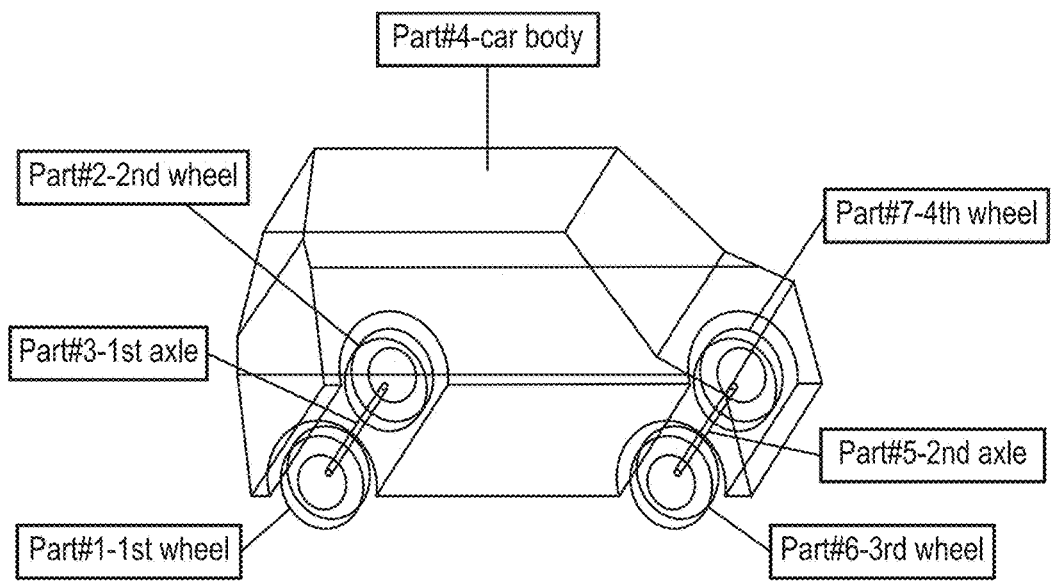
FIG. 2 illustrates an example of an assembly model.
Figure 3:
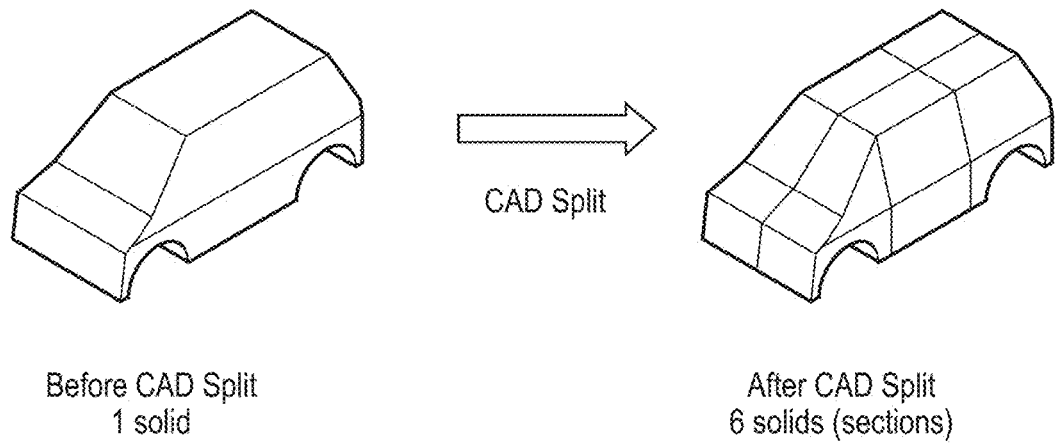
FIG. 3 illustrates a CAD split operation.

An assembly model is a CAD model consisting of multiple solids, which may or may not be in physical contact with each other. A simple assembly model consisting of seven parts, labelled Parts#1 to #7, is shown in FIG. 2. Real-world assembly models used in industry, which this invention targets, can have hundreds or thousands of parts, of different shapes and sizes. Throughout the present application, the term part will have the meaning of a single solid component of an assembly model. For the sake of consistency, if the input CAD file consists of a single solid, we will refer to it as an assembly with one part.

CAD Splitting (Cutting, Partitioning)

In the present application CAD splitting is defined as the operation of splitting/cutting/partitioning a solid into a number of sections. For example, in Error! Reference source not found.3, Part #4 of the assembly model is split into 6 sections (thus 6 individual solids).

2D Meshing

A 2D meshing operation is the discretization of the faces of a solid by 2D elements such as triangles or quadrilaterials. As an example, Error! Reference source not found.4 shows a 2D triangular mesh of one of the sections of Part #4.

3D Meshing

Figure 4:
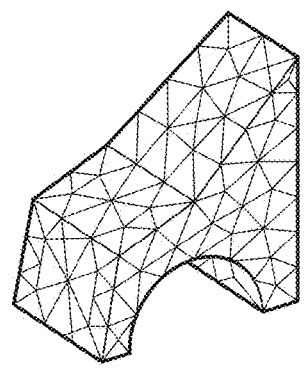
FIG. 4 illustrates a 2D meshing operation.
Figure 5:
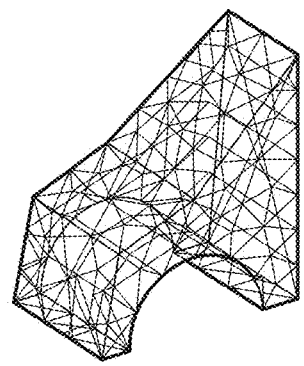
FIG. 5 illustrates a 3D meshing operation.
Figure 6:
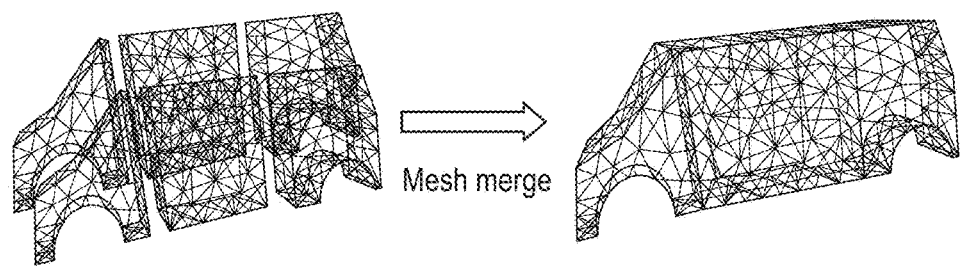
FIG. 6 illustrates a mesh merging operation.

A 3D meshing operation is the discretization of the entire volume of a solid by 3D elements such as tetrahedrals or hexahedrals. As an example, Error! Reference source not found.5 shows a 3D mesh of one of the sections of Part #4 shown in FIG. 4.

Mesh Merge Operation

A mesh merge operation is the combining of the 3D meshes of the individual sections of a part into one coherent 3D mesh for that part. A coherent mesh is defined as one single connected mesh, without duplicate nodes on the interfaces between sections. As an example, Error! Reference source not found.6 shows how the 3D mesh for Part #4 is built by merging the 3D meshes of the 6 individual sections the part was previously split into (as shown in Error! Reference source not found.3).

Mesh Assembly

A mesh assembly operation is the putting together of the meshes for one or more individual parts into one single mesh for the assembly model. The difference between mesh assembly and mesh merging is that an assembled mesh does not become one single connected mesh. In other words, even if the meshes of two parts are in physical contact, the interface will contain two sets of nodes and elements, one set for each mesh. More formally, there is no element in the assembled mesh which has nodes belonging to the meshes of more than one part. As an example, Error! Reference source not found.7 shows how the meshes for the 7 parts of the assembly model are assembled into the final mesh.

Figure 8:
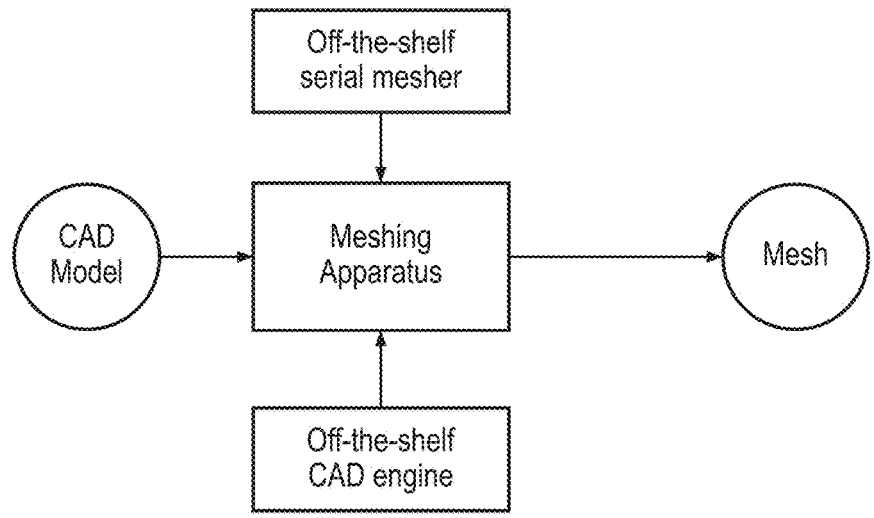
FIG. 8 is a flowchart showing where a meshing method embodying the present invention can be used in a CAD system.
Figure 9:
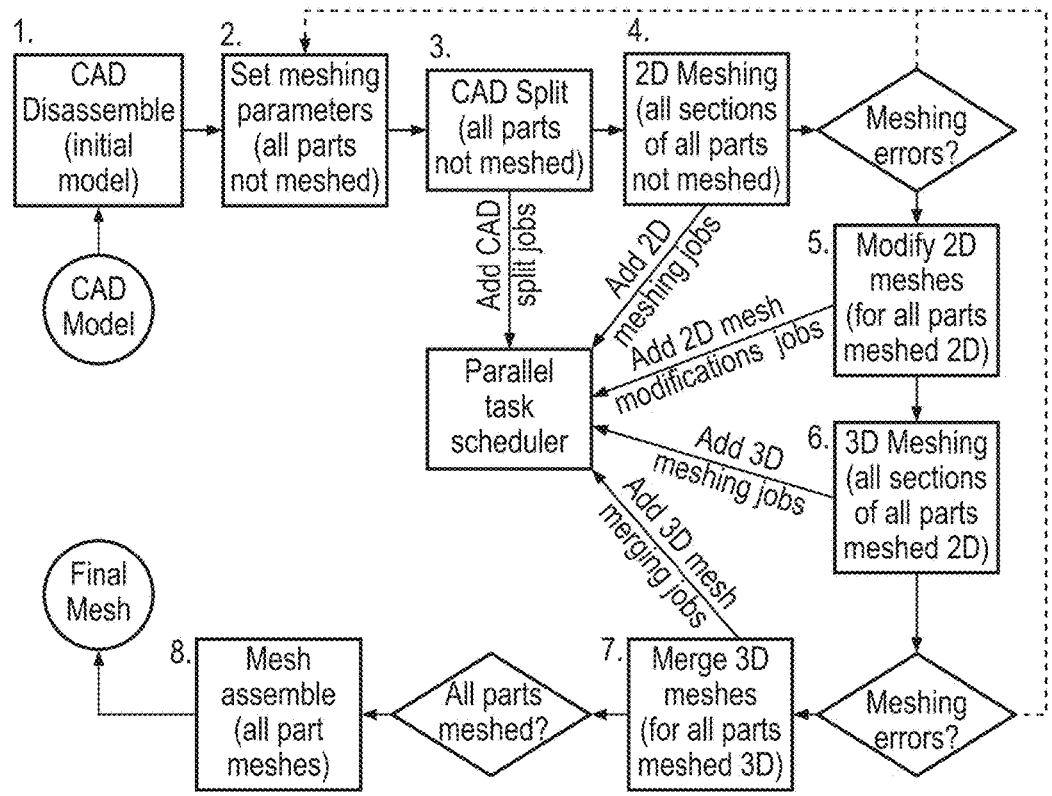
FIG. 9 is a flowchart of a meshing method embodying the present invention.

FIG. 8 shows where a meshing method embodying the present invention can be utilized in a CAD system, and the flowchart of FIG. 9 shows how a meshing method embodying the present invention can be regarded as being built from one or more individual processes or modules 1 to 8, depicted in FIG. 9 as rectangular blocks. These modules, which are described later, are used in sequence, starting with the reading of the CAD file that is to be meshed and ending, in the case the meshing is successful, with a 3D mesh of the CAD file.

Module 1 is a CAD Disassemble module, module 2 is a Mesh Parameter Setting module, module 3 is a CAD Split module, module 4 is a 2D Meshing module, module 5 is a 2D Mesh Modification module, module 6 is a 3D Meshing module, module 7 is a 3D Mesh Merging module, and module 8 is a Mesh Assemble module.

Module 1 (CAD Disassemble) and module 8 (Mesh Assemble) each consist of one large operation, namely disassembling the initial CAD file into individual components and assembling the final mesh from individual parts, respectively. On the other hand, the other modules consist of a possibly large number of individual operations. From these, modules 2 (Mesh Parameter Setting), 3 (CAD Split), 5 (2D Mesh Modification) and 7 (3D Mesh Merging) result in as many tasks as parts to be meshed. Modules 4 (2D Meshing) and 6 (3D Meshing) can potentially allow the opportunity for a much higher degree of parallelism, since each part that needs to be meshed can be further split (partitioned) into a number of sections.

All tasks that need to be executed are queued in a parallel task scheduler (module 9 in FIG. 9) which executes them following the chain of dependencies associated with the tasks. For example, a 2D meshing operation for all sections of one part is dependent only on the successful completion of the previous CAD split operation for that part. In other words, as soon as the CAD split operation has finished for one part, the 2D meshing of all resulting sections can begin. In the same way, if the 2D meshing of one section of a part fails, the 2D meshing of all other parts will be aborted and the process will be restarted from module 2, where new meshing parameters will be automatically set.

For traditional parallel meshers, which start with one solid and mesh one solid (thus one part) at a time, modules 3, 6 and 7 are performed serially and hence become a bottleneck. On the other hand, in an embodiment of the present invention, which starts with an entire assembly model, these steps are executed in parallel with other operations. Moreover, there is a very high probability that the input/output (I/O) intensive operations involved in modules 6 and 7, which do not scale well with the number of cores, are overlapped with compute intensive operations like 2D and 3D meshing (modules 4 and 6), hence making more efficient use of the computing environment.

The modules 1 to 9 will now be described in more detail with reference to FIGS. 10 to 22.

CAD Disassemble Module

Figure 10:
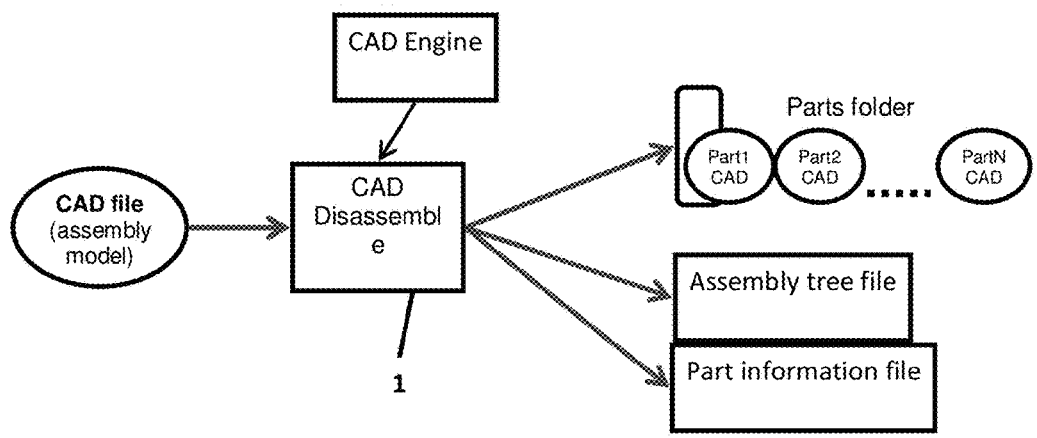
FIG. 10 illustrates a CAD Disassemble module.

The CAD Disassemble module 1, shown in FIG. 10, takes as input one assembly CAD file and outputs the following:

- A folder with the individual parts of the assembly, one CAD file per part
- One file containing the assembly tree, for later reference. The assembly tree contains information about how individual parts are organized in the assembly hierarchy.
- One file containing high level geometrical information about each part. For each part, such information might be the size of the bounding box, total surface or total volume. This information will be used later to decide meshing parameters like the maximum element size and are extracted at this stage to avoid re-loading the geometry later.

This module is capable of reading/writing CAD files and extracting additional information like total surface and total volume via a CAD Engine. Examples of such CAD engines are Open Cascade™ (free and open source) and ACIS™ (commercial).

Functions from the CAD engine are used to read the initial CAD file and the assembly tree structure. The tree is then traversed from the root to the leaves and all individual components are written as separate files in the destination folder, again using specialized functions from the CAD engine. After writing each part, additional information like bounding box size, total surface and total volume are computed using functions from the CAD engine and written to the "part information file". At the same time, the structure of the assembly tree is written to the "assembly tree file".

Mesh Parameter Setting Module

Figure 11A:
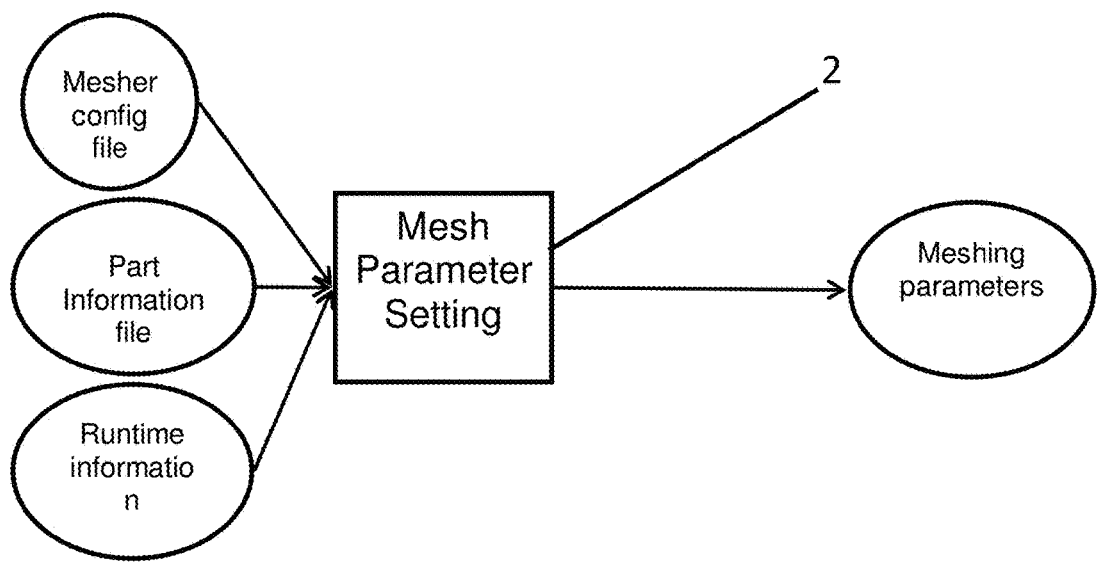
FIG. 11A illustrates a Mesh Parameter Setting module.

The Mesh Parameter Setting module 2, shown in FIG. 11A, is responsible for setting input parameters for the meshing operation. Examples of such parameters are the type of element, the order of the elements, maximum element size, 2D and 3D meshing algorithms, whether to use optimization, and so on.

A meshing method embodying the present invention, for use in a CAD system, in which one or more serial meshing units are used to carry out a decoupled parallel meshing process in respect of all parts of a CAD assembly model, comprises setting input parameters for the meshing process automatically, for each part to be processed, using live runtime information about the meshing process for the part concerned.

According to an embodiment of this aspect of the invention meshing parameters are automatically set as a function of default settings, the geometrical properties of the object to be meshed and dynamical runtime information.

That is, meshing parameters are decided independently for each part to be meshed and are provisionally selected using information from three sources:

- The mesher configuration file. This contains meshing parameters that remain unchanged throughout the meshing process, like the type of elements to use (e.g. tetrahedral or hexahedral) and their order (e.g. 1$^{st}$ order or 2$^{nd}$ order)
- The part information file. This file, generated by the CAD Disassemble module, provides geometrical information on the part that is to be meshed, like the size of the bounding box or the total volume
- Runtime information. This is live information about the meshing process, for example the fact that this is the i$^{th}$ time this part is being meshed (because previously the meshing had failed). Runtime information is used in order to recover from meshing failures, for example to restart meshing a part, which previously could not be meshed, using a different set of parameters (e.g., a smaller maximum element size).

Preferably the same meshing parameters are used for meshing all sections of a part, since this makes implementation of modules 5 (2D Mesh Modification) and 7 (3D Mesh Merging) much easier.

In an embodiment of the Mesh Parameter Setting module 2, the module reads the type and order of the elements together with the initial maximum element size (initial_max_element_size) from the mesher configuration file. The module also reads the size of the bounding box (size_of_bounding_box) of the part from the part information file. Finally, the module uses runtime information consisting of whether the meshing of this part has previously failed and, if so, the previous meshing parameters (e.g. previous_max_elem_size). The module then sets the maximum element size for the current meshing operation in the following way:

Min(size_of_bounding_box/factor1, initial_max_element_size), if this is the first attempt to mesh the part Min(previous_max_elem_size/factor2, initial_max_element_size), if this is not the first attempt, where operation Min finds the minimum value satisfying the equation and factor1 and factor2 are two parameters read from the mesher configuration file. For example, in one embodiment the value of factor1 may be 10 while the value of factor2 may be 2.

Figure 11B:
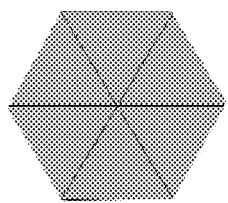
FIGS. 11B to 11F illustrate meshing operations.
Figure 11D:
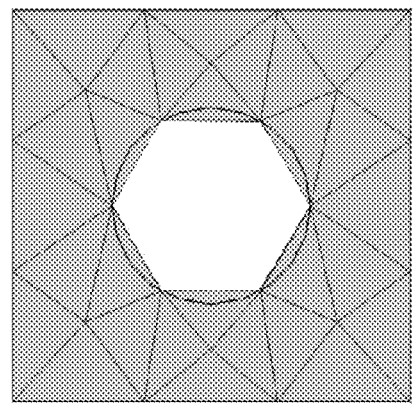
Figure 11C:
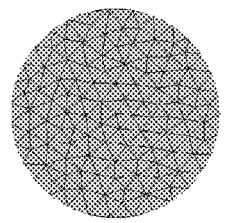
Figure 11E:
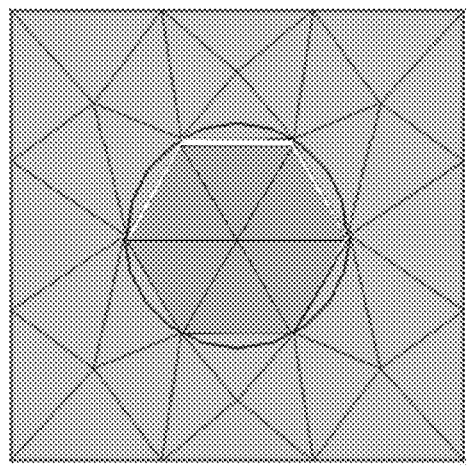
Figure 11F:
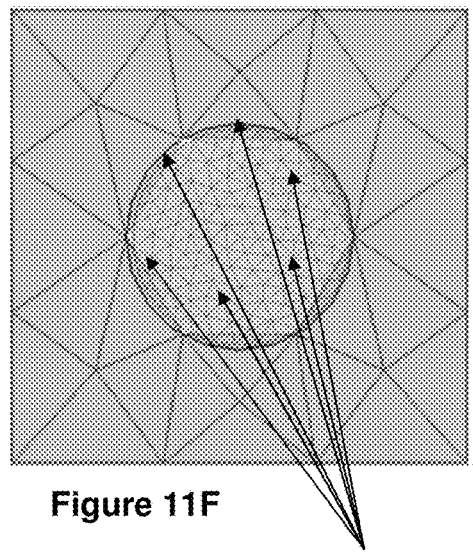

There are cases where the meshing process needs to take into account the relation between the components in an assembly model. For example, it is sometimes beneficial to have components found in close physical proximity meshed using the same element size. An example of such a case is shown in FIGS. 11B to 11D, where two components—a cylindrical axle and a cube with a cylindrical hole—are considered. FIGS. 11B and 11C respectively show the axle component with a low resolution mesh and a high resolution mesh, while FIG. 11D shows the cylindrical hole component with a low resolution mesh. When the components in FIGS. 11B/11C and 11D are used together for simulation, it is preferable to have both components meshed at the same resolution (low resolution in this case, as shown in FIG. 11E). If that is not the case, the meshes of the components could overlap, as shown in FIG. 11F where the axle component has been meshed at a higher resolution than the cube component.

Cases such as the ones above can be handled using input information indicating dependencies (relations) between meshing parameters (e.g., the maximum element size) for different parts. For example, one such dependency might be that the maximum element size for both parts should be the same. A more advanced case is when the method requires the meshes for the interface to be the same. In this case, as in the previous one, the same meshing parameters have to be used for the both parts in the assembly model. As described below with reference to the Mesh Merge Module 7, the procedure used in the Mesh Merge module 7 is also used to ensure the interface surface meshes are consistent.

In a Mesh Parameter Setting module embodying the present invention, automatically setting the input parameters may therefore advantageously comprise provisionally selecting the parameters for each part using live runtime information about the meshing process for the part concerned and subsequently, for each part for which there is a known dependency requirement between an input parameter for the part and an input parameter for at least one other part of the assembly model, determining if a provisionally selected parameter for the part or a provisionally selected parameter for the at least one other part is inconsistent with the dependency requirement and, if so, adjusting the provisionally selected parameter for the part and/or the provisionally selected parameter for the at least one other part to meet the dependency requirement.

In one embodiment of the invention a Mesh Parameter Setting module 2 may be operable, after the meshing parameters have been decided independently and provisionally selected for each part to be meshed, to use information from an assembly information file to confirm or adjust the parameter selected for each part. The assembly information file contains information about any dependencies between parts of the assembly model which is used to ensure that meshing parameters between dependent parts are mutually consistent. For example, if there is a dependency between two or more parts of the assembly model which requires the element size for those parts to be the same then, after the element size for each part has been computed independently, the Mesh Parameter Setting module 2 is operable to adjust the provisionally-selected element sizes so that the minimum element size of all the parts concerned is used for all of those parts.

CAD Split Module

Figure 12:
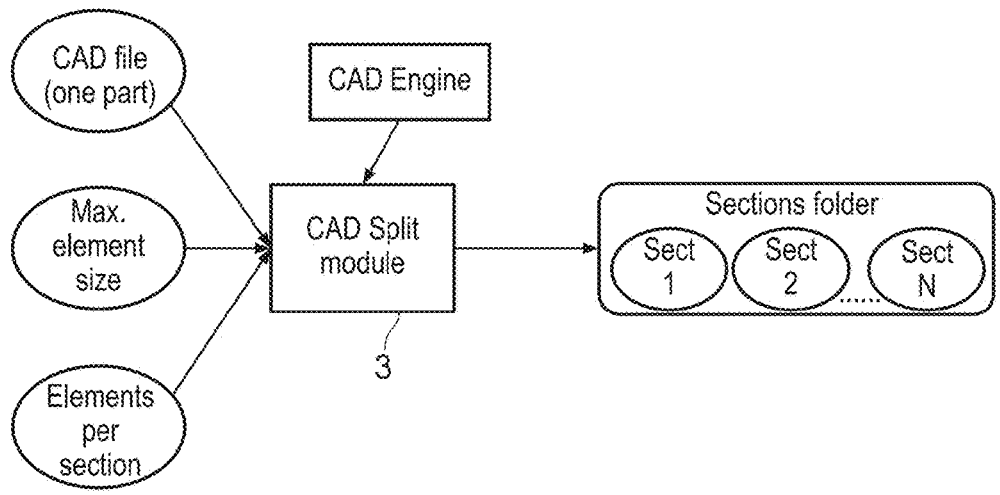
FIG. 12 illustrates a CAD Split module.

The CAD split module 3, shown in FIG. 12, is responsible for partitioning a CAD part into a number of sections. The number of sections is computed so that the maximum number of elements in the resulting 3D mesh is approximately a specified value, denoted here as "Elements_per_section".

In an embodiment of the present invention the desired number of sections DN is computed in the following way:
1. The maximum element size obtained from the meshing parameters computed by the Mesh Parameter Setting module 2 is used to approximate the volume VE of an element in the mesh using the mathematical formula associated with the geometric shape of that element.
2. The total number of elements for the entire part is approximated as NE=VP/VE, where VP represents the volume of a part obtained from the part information file generated by the CAD Disassemble module 1.
3. The desired number of sections will then be DN=Ceil (NE/Elements_per_section), where the Ceil function performs rounding to the closest larger integer.

After computing DN, the CAD Split module 3 proceeds to generate the sections. In the present embodiment this operation is performed by recursive bisection and two ways of achieving this are described below.

Recursive Bisection Technique (a)

A recursive bisection method embodying the present invention, in which method a part of an assembly model is split into sections prior to undergoing a CAD meshing process, and a volume of each section obtained must not exceed a maximum permitted volume, comprises, if the volume of the first section exceeds the maximum permitted volume, considering the part to be the first section and then carrying out the steps of:

(a) determining the principal axis of inertia A of the section;
(b) determining the centre of gravity of the section;
(c) defining first and second solid boxes whose intersection is one face that passes through the centre of gravity and is perpendicular to A and whose union is the entire bounding box of the section;
(d) performing a CAD Boolean operation of the section and the first box, and a CAD Boolean operation of the section and the second box, to obtain respective intermediate sections; and
(e) if the volume of a section obtained in step (d) exceeds the maximum permitted volume, repeating steps (b) to (d) for each of the sections obtained in step (d) until final sections whose volumes do not exceed the maximum permitted volume are obtained.

Depending upon the CAD engine employed, the Boolean operation used in step (d) to obtain the first sub-section need not be the same as that used to obtain the second sub-section at the same stage, nor may it be necessary to use the same Boolean operation(s) on each occasion that step (d) is carried out.

In one embodiment, firstly the maximum volume per section MVS=VE*Elements_per_section is computed. The method of recursive bisection then proceeds as follows:
1. Set the 1$^{st}$ section to be the entire part
2. If the volume of the section is smaller than VE, write section to file, using functions provided by the CAD engine.
3. Else
   a. Compute the matrix of inertia, using functions provided by the CAD engine, and from here compute the principal axis of inertia A (this will minimize the area of the cut section).
   b. Compute the center of gravity of the section, using functions provided by the CAD engine.
   c. Use the CAD engine to create two solid boxes, whose intersection is one face that passes through the center of gravity and is perpendicular to A, and whose union is the entire bounding box of the section.
   d. Compute the two sub-sections of the original section as the Common or Cut of the initial section and the first, then the second box, where the Common and Cut operations are the Boolean operations with the same name provided by the CAD library
   e. For each of the two sub-sections, start at step b and continue until the volume of each sub-section is equal to or smaller than MVS.

Figure 13:
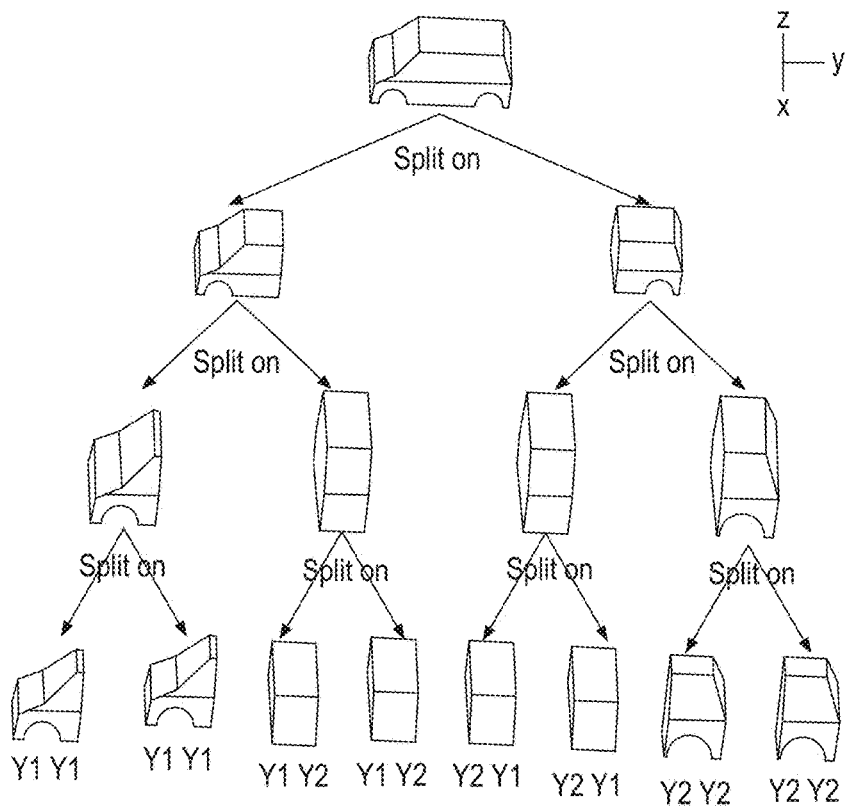
FIG. 13 illustrates a CAD splitting operation carried using a recursive bisection technique.

An example of how this procedure works is shown in FIG. 13, where the procedure is used on Part #4 (car body) from Error! Reference source not found.2. The part is first split in the Y direction, since that is its principal axis. The resulting sub-sections have the same principal axis, so both are split again in the Y direction, resulting in four sections. Then, the first and the last are cut again in the X direction while the two middle ones are cut in the Z direction. The final eight sections, whose volume is equal to or smaller than the specified maximum volume, are saved to files.

An efficient and easy to implement way of storing the information needed later in order to reconstruct the final mesh is to append, after each cut, at the current name of the section the direction of the cut and the number "1" for the first sub-section and the number "2" for the second sub-section. For example, after the first cut in the Y direction, the two sub-sections in FIG. 13 will be called Y1 and Y2 respectively, while the four sub-sections generated after the second cut in the Y direction will be named Y1_Y1, Y1_Y2, Y2_Y1 and Y2_Y2, respectively. The names of the final eight sections are shown at the bottom of the figure. As the information contained in these names fully describes the splitting tree, all the necessary information for merging the sections is available.

The recursive-bisection method for CAD splitting is very efficient in the sense that the area of the interface between the sections is minimized. Moreover, the size of the sections is relatively balanced, since the cut is made through the centre of gravity. However, the fact that sections which are in contact with each other can be cut in different places and on different directions may lead to a problem, in that the geometry on the opposing faces of the interface between parts may be different.

Figure 14:
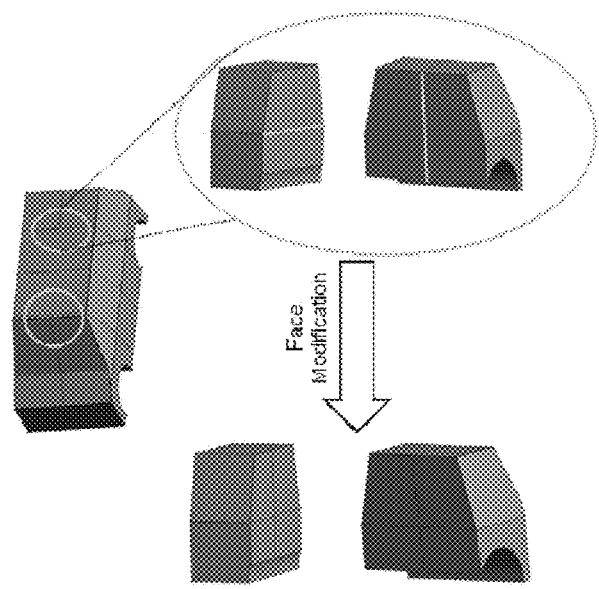
FIG. 14 illustrates a face modification technique.

This problem is illustrated in FIG. 14, where the opposing faces of two adjacent sections have one horizontal line (left) and one vertical line (right), respectively. The geometry on these faces needs to be the same in order to allow a more efficient implementation of the mesh merging algorithm (modules 5 and 7 in the flowchart shown in FIG. 9).

In order to make adjacent faces have the same geometry, this invention proposes the following method:

For all sections Si of a part (the final ones, the leaves in the splitting tree)
    Let C=Si
    For all sections Sj≠Si that are in physical contact with Si
        Perform CAD operation F=Fuse(C,Sj)
        Perform CAD operation C=Common(F,Si)

Here Fuse and Common represent the Boolean operations with the same name provided by the CAD Engine. Boolean operation Fuse creates a shape from two shapes. Boolean operation Common transforms the common part of two objects into an independent object.

The effect of applying such a method is the modification of the opposing faces of the interfaces between sections such that their geometry becomes the same. This result can be seen at the bottom of FIG. 14, where both opposing faces now have identical geometry (both the vertical line and the horizontal line are present).

Thus, a module embodying the present invention is operable, after a part of a CAD assembly model has been split into a desired number DN of final sections using a recursive bisection method, to carry out a modification process, for all final sections Si of a part, where i=2 to DN, comprising: setting C=Si and, for all sections Sj≠Si which have an interface with section Si, performing CAD Boolean operation F=Fuse(C, Sj) and CAD Boolean operation C=Common (F, Si), whereby opposing surfaces at interfaces between adjoining sections are modified so as to have identical geometry.

Splitting based on recursive bisection technique (a) is the most efficient, however the applicability of the technique depends on the quality of CAD data (the presence of CAD errors) and on the implementation of the Boolean operations provided by the CAD engine. More specifically, if the CAD model contains errors, as it is often the case in industry, and/or if the Boolean operations are not mature enough, the sequence of Fuse/Common operations that needs to be applied in order to make the geometry of the adjacent faces match might fail due to CAD engine error. In such cases, a fallback technique, which is less efficient but more robust, may be used. This technique is described below as recursive bisection technique (b) and is sometimes referred to in the present application as the grid-aligned recursive bisection method.

Recursive Bisection Technique (b)—Grid-Aligned

An alternative recursive bisection method embodying the present invention, in which method a part of a CAD assembly model is split into a desired number DN of sections prior to undergoing a CAD meshing process, comprises the steps of:

(a) determining (i) the number of split points Nx in an X direction, (ii) the number of split points Ny in a Y direction and (iii) the number of split points Nz in a Z direction, where the X, Y and Z directions are mutually parallel and $(Nx+1)(Ny+1)(Nz+1) \geq DN$;

(b) recursively bisecting the part in the X direction until $(Nx+1)$ sections are obtained;

(c) for all sections obtained in step (b), recursively bisecting the sections in the Y direction until $(Nx+1)(Ny+1)$ sections are obtained; and (d) for all sections obtained in step (c), recursively bisecting the sections in the Z direction until $(Nx+1)(Ny+1)(Nz+1)$ sections are obtained.

In such a grid-aligned recursive bisection method the input geometry is cut along a Cartesian grid. The grid need not be uniform, in the sense that cuts can be denser at certain places as compared to the rest. If Nx, Ny and Nz are the number of cuts in the X,Y,Z directions, respectively, then the input geometry will be partitioned into $(Nx+1)*(Ny+1)*(Nz+1)$ sections.

An embodiment of the technique proceeds as follows:

1. Considering the geometry of the input CAD file (e.g., aspect ratio of the bounding box), derive cut points in X, Y and Z directions such that $(Nx+1)*(Ny+1)*(Nz+1) \geq DN$
2. Recursively cut the geometry along the X direction in half and then in half again, and so on until Nx+1 slabs are obtained.
3. For all slabs generated at step 2, recursively cut the geometry along the Y direction in half and half again, until $(Nx+1)*(Ny+1)$ pencils are obtained.
4. For all pencils generated at step 3, recursively cut the geometry along the Z direction in half and half again, until $(Nx+1)*(Ny+1)*(Nz+1)$ sections are obtained.
5. All sections are written to files.

The cutting of the geometry is done in the same way as it was done for the previously-described recursive bisection technique (a), with the difference that the point of the cut is not the center of mass but the coordinate of the cut point being chosen. If none of the cut points are placed at the middle of the geometry being cut, the cut point closest to it will be chosen. Sections may be named according to their position in space, starting from X0_Y0_Z0, X1_Y0_Z0 and ending with X(Nx+1)_Y(Ny+1)_Z(Nz+1).

Figure 15:
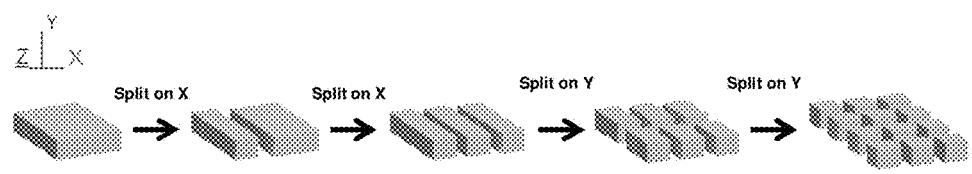
FIG. 15 illustrates another CAD splitting operation carried out using an alternative recursive bisection technique.

An illustration of how this technique works is shown in FIG. 15, where a 3D object is cut into 12 sections, on the basis of Nx=2, Ny=3 and Nz=0. Cut points spaced uniformly in all directions are chosen in this example. First, the input object is split in the X direction. Since there is no cut point in the middle, the first cut splits the solid in a ratio of 1/3 to 2/3. In the next step, the 1/3 part is kept unmodified while the 2/3 part is halved. After this second step both cuts in the X direction have been completed, so cutting in the Y direction is carried out. The four cuts are performed in two steps, resulting in 12 sections.

Since geometry cutting was done in a consistent way and resulting sections are aligned, the geometry of the opposing faces of the interfaces between sections will be the same by construction. Hence, unlike after recursive bisection technique (a), there is no need for further processing of the faces at this stage.

In summary a CAD split module 3 embodying the present invention can provide:
- an automated way to compute the number of sections
- a domain partitioning method for CAD objects based on Boolean operations
- a naming convention which stores the partitioning information
- a method of grid-aligned recursive bisection
- For CAD solids split based on recursive bisection, an efficient way to ensure that the geometries on the interfaces match

2D Meshing Module

Figure 16:
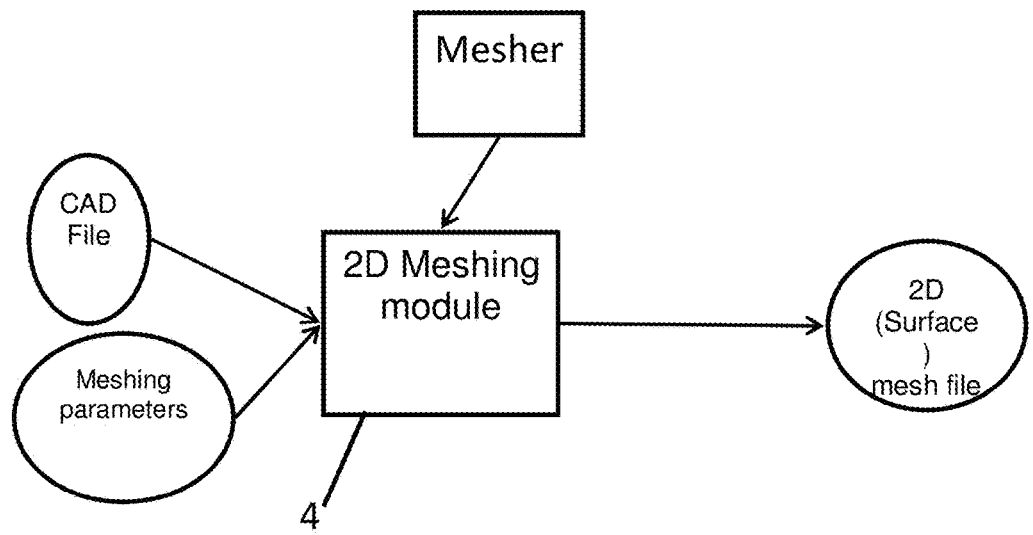
FIG. 16 illustrates a 2D Meshing module.
Figure 17:
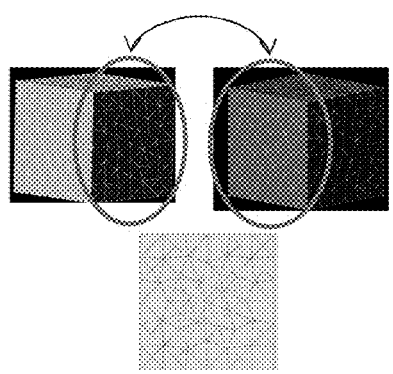
FIG. 17 illustrates sections obtained using a CAD splitting operation.

The function of the 2D Meshing module 4 is to create a 2D (surface) mesh starting from CAD geometry. The layout of the module is shown in FIG. 16. The module 4 can use any off-the-shelf unmodified mesher to create the 2D surface mesh of the CAD file given as input and using the specified meshing parameters. The CAD file is a section of a part, generated by the CAD split module, while the meshing parameters are computed by the Meshing Parameter Setting module 2.

2D Mesh Modification Module

Figure 7:
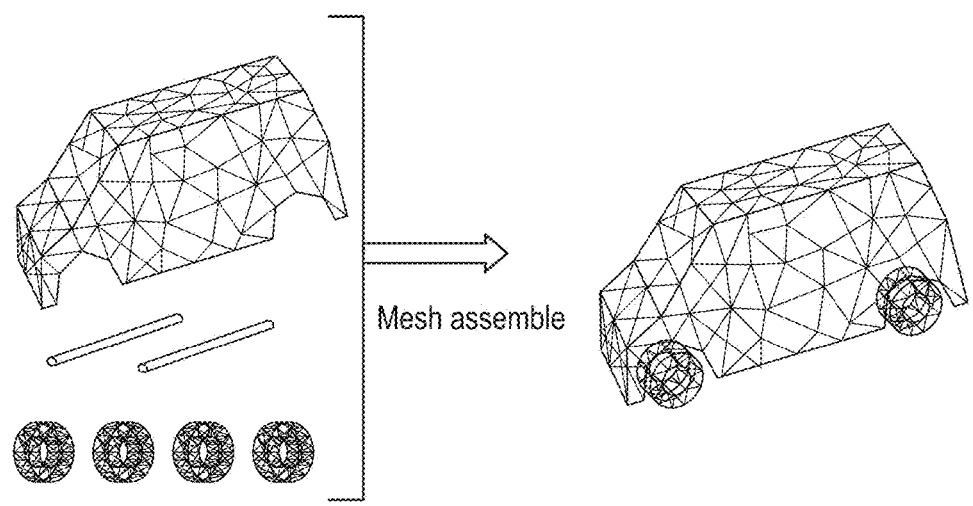
FIG. 7 illustrates a mesh assembly operation.

The function of the 2D Mesh Modification module 5 is to modify the surface meshes for all the sections of one part such that the meshes of sections which have an interface with one another are the same. This is important when using meshers which use randomized meshing algorithms, for which there is no guarantee that the same geometry will be meshed in the same way every time. Actually, for meshers like Gmsh™ or Netgen™, which are currently two of the most widely-used pieces of open source meshing software, the 2D and 3D meshes generated for the same input CAD file are different almost every single time the program is run. This issue is illustrated in FIG. 7, where the meshes of the two adjacent sections cannot be combined because the 2D meshes on the common face are different. However, the two meshes match on the 1D contour of this face. Thus an embodiment of the present invention recognizes that the restriction imposed on serial meshers used as bases for parallel meshing in the prior art, that they should always generate the same 2D surface mesh, may advantageously be relaxed, and proposes that the mesher only be required to generate the same 1D edge mesh.

An embodiment of the present invention provides a method of modifying a 2D mesh at a surface of a section obtained in a CAD process, where an assembly model which is the subject of the CAD process has been separated into different parts each of which is split into sections which are then subjected to 2D meshing such that each surface of the section is defined by a set of 2D elements produced using a meshing method which generates the same 1D edge mesh at every surface, the method comprising, for all sections for which the method has not already been carried out and which have an interface with another section:

matching nodes of elements along edges of a surface of a section on one side of the interface with nodes of elements along edges of an opposing surface of a section on the other side of the interface; and replacing the elements on the surface on one side of the interface with the elements on the surface on the other side of the interface.

Figure 18:
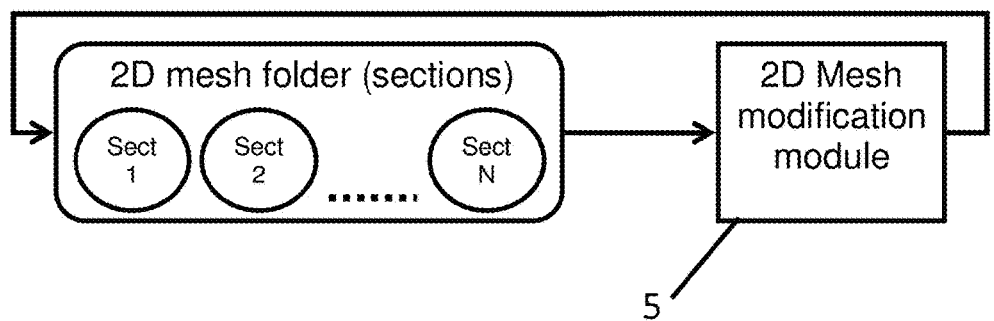
FIG. 18 illustrates a 2D Mesh Modification module.

FIG. 18 shows such a 2D Mesh Modification Module 5, which performs an in-place modification of the 2D meshes found in a specified folder. It is assumed that these meshes are the ones resulting from the 2D meshing (for example, using the 2D Meshing module 4) of all the sections for one part.

An embodiment of the modification method is as follows:
For all sections of the part:
1. Compute list of neighbouring parts, for example using the name of the file to find the position in the bisection tree and bounding box information
2. Remove from the list neighbours with which the 2D mesh modification operation has already been performed
3. For the neighbours still in the list:
   a. Find the elements on the common face
   b. Choose who is the source and who is the destination (e.g., the neighbour is the source)
   c. Match the nodes on the 1D edges, for example using Euclidian distance
   d. Replace the elements on the source face with the ones from the destination face, considering the match between the nodes when performing the renumbering The method listed above can be applied in the case when the CAD Split module 3 uses the recursive bisection technique (a). If the grid-aligned recursive bisection technique (b) is used, then an alternative, more optimized method is preferably used.

That is, an alternative embodiment provides a method of modifying a 2D mesh at a surface of a section obtained in a computer-aided design CAD process, where an assembly model which is the subject of the CAD process has been separated into different parts each of which is split into sections which are then subjected to 2D meshing such that each surface of the section is defined by a set of 2D elements produced using a meshing method which generates the same 1D edge mesh at every surface, the method comprising:

allocating all the sections of the part to either a first set or a second set according to the location of the section in the part such that all the sections which have an interface with the sections in the first set are allocated to the second set;

for each of the sections in the first set, matching nodes of elements along edges of a surface of a section in the first set with nodes of elements along edges of an opposing surface of a section in the second set; and replacing the elements on the surface of the first set section with the elements on the surface on the second set section.

For example, where the sections have been numbered as previously discussed, such a method can be implemented in the following way:
1. Divide sections into a red set and a black set, where the sections in the red set are the ones for which the sum of the indices is odd and the sections in the black set are the ones for which it is even. For example, the section named X0_Y0_Z0 will be in the black set since 0+0+0=0 is even while the one named X1_Y0_Z0 will be in the red one since 1+0+0=1 is odd.
2. For all sections in the red set, do
   a. Use file name information and bounding box information to establish a list of neighbours (all of which will be from the black set)

b. For each neighbouring section, do
   i. Find the elements on the common face
   ii. Save these elements to a file or to memory
3. Wait until the processing of sections in the red set has finished
4. For all sections in the black set, do
   a. Use file name information and bounding box information to establish a list of neighbours (all of which will be from the red set)
   b. For each neighbouring section, do
      i. Find the elements on the common face
      ii. Load the new elements for that face from file or from memory
      iii. Match the nodes on the 1D edges using Euclidian distance
      iv. Replace the old elements with the new ones, considering the match between the nodes when performing the renumbering By waiting at step 3 for the processing of all sections in the red set to finish before beginning to process the sections in the black set, all the data required for the modification stage is available, making implementation easier. However, using a dynamic scheduler such as the one discussed later, a destination (a section in the black set) could be processed immediately following the extraction of data from all sources in the red set that it depends on, i.e. sections in the red set and sections in the black set can be processed in parallel.

3D Meshing Module

Figure 19:
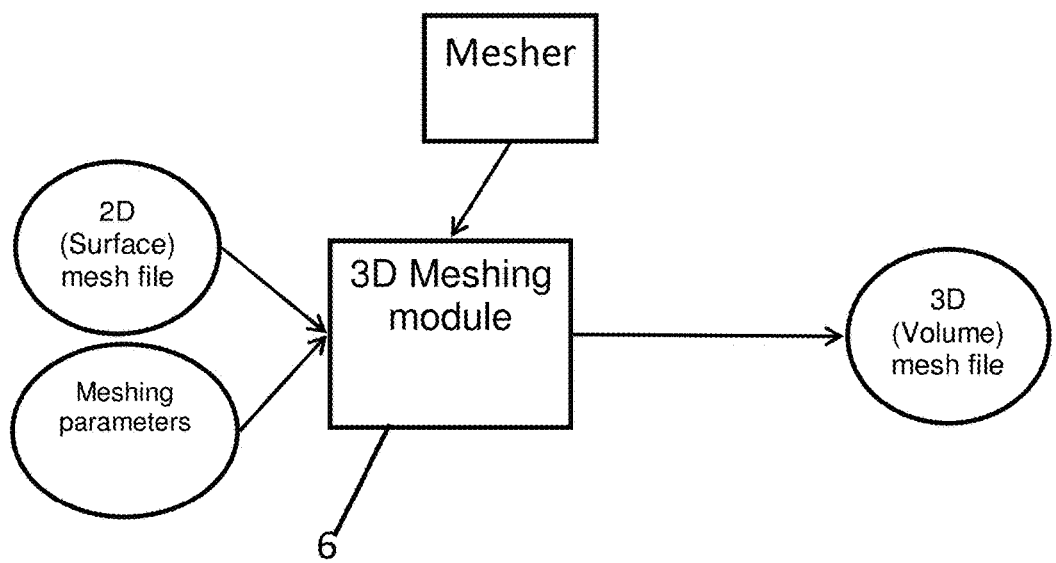
FIG. 19 illustrates a 3D Meshing module.

The function of the 3D Meshing module 6 is to create a 3D (volume) mesh starting from 2D surface geometry. The layout of the module is shown in FIG. 19. The module 6 can use an off-the-shelf unmodified mesher to create a 3D volume mesh from the 2D surface mesh file given as input and using the specified meshing parameters. The 2D surface mesh file is the 2D mesh of a section of a part, generated by the 2D Meshing module 4 and modified by the 2D Mesh modification module 5, while the meshing parameters are computed by the Meshing Parameter Setting module 2. The only restriction imposed on the 3D Mesher is that it does not add any new nodes on the 2D surface. One example of a meshing algorithm with this property is the Frontal method, used in meshers like Gmsh™ and Netgen™.

3D Mesh Merging Module

The function of the 3D Mesh Merging module 7 is to combine the 3D meshes corresponding to all the sections of a part into one single coherent mesh (i.e. two meshes connected on the interfaces between sections from which duplicate nodes have been removed).

Figure 20:
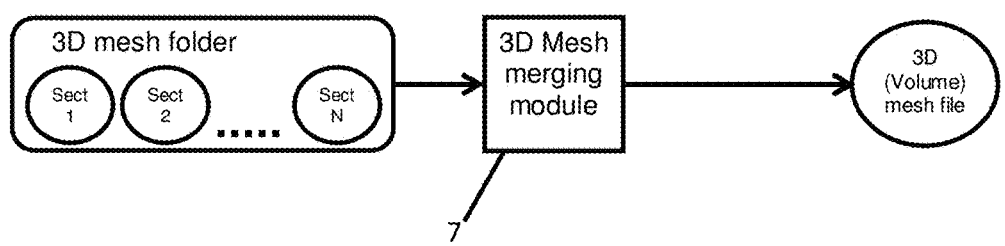
FIG. 20 illustrates a 3D mesh merging operation.

The 3D Mesh Merging module 7, whose layout is shown in FIG. 20, takes as input a folder containing the 3D meshes for all the sections of a part and outputs one mesh file for the entire part. Because of the previously applied 2D Mesh Modification module 5 and because of the fact that the 3D Meshing module 6 is required not to add any new nodes on the surface mesh, the nodes and elements on the interface between sections are guaranteed to match perfectly. The merging is then done by finding the pairs of duplicate nodes on the interfaces between sections, removing one of the two and renumbering accordingly.

Mesh Assembly Module

The function of the Mesh Assembly module 8 is to combine the 3D meshes for all of the parts of the assembly module into one assembly mesh. Note that "assembly" is different from "merging", since in the former case, even for meshes which have interfaces with other meshes, these meshes remain independent and duplicate nodes are not removed.

Figure 21:
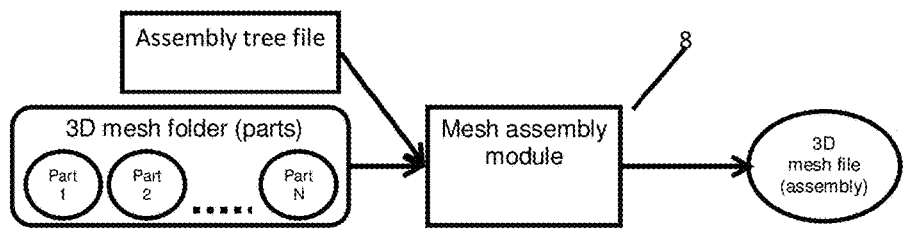
FIG. 21 illustrates a Parallel Task Scheduling module.

The Mesh Assembly module 8, whose layout is shown in FIG. 21, takes as input a folder containing the meshes of all parts in the assembly and the assembly tree and outputs one assembly mesh file.

Parallel Task Scheduler Module

The function of the Parallel Task Scheduler module 9 is to manage the execution of the previously described modules 1 to 8 on the processing elements assigned to it, which can range from cores in the same machine or multiple machines in a cluster. The execution of tasks is done based on a list of dependencies, with a task being scheduled for execution as soon as all the tasks it depends on have been completed and a free processing element is available.

A module embodying the present invention, for managing the execution of tasks in a decoupled parallel meshing process, in which the execution of one or more tasks may be dependent upon the execution result of at least one other task, and each task is scheduled for execution after the execution result of at least one of the tasks upon which it depends is known and processing resources for the task are available, prioritises execution of one or more tasks over one or more other tasks in accordance with a prioritisation criterion, the prioritisation criterion being, depending on a characteristic of the task, either that, on the basis of information relating to one or more previous attempts to execute the task or similar tasks, the task is deemed to be more likely to succeed than other tasks to be executed, or that, on the basis of information relating to one or more previous attempts to execute the task or similar tasks, the task is deemed to be more likely to fail than other tasks to be executed.

An embodiment of the present invention can manage the execution of modules needed for parallel meshing, abort tasks that have become obsolete (e.g., abort the meshing of the rest of the sections if the meshing of one of the sections has failed), and keep a history of successful and failed tasks and use it in order to schedule as early as possible tasks more likely to succeed or more to likely to fail, depending on characteristics of the tasks.

Figure 22:
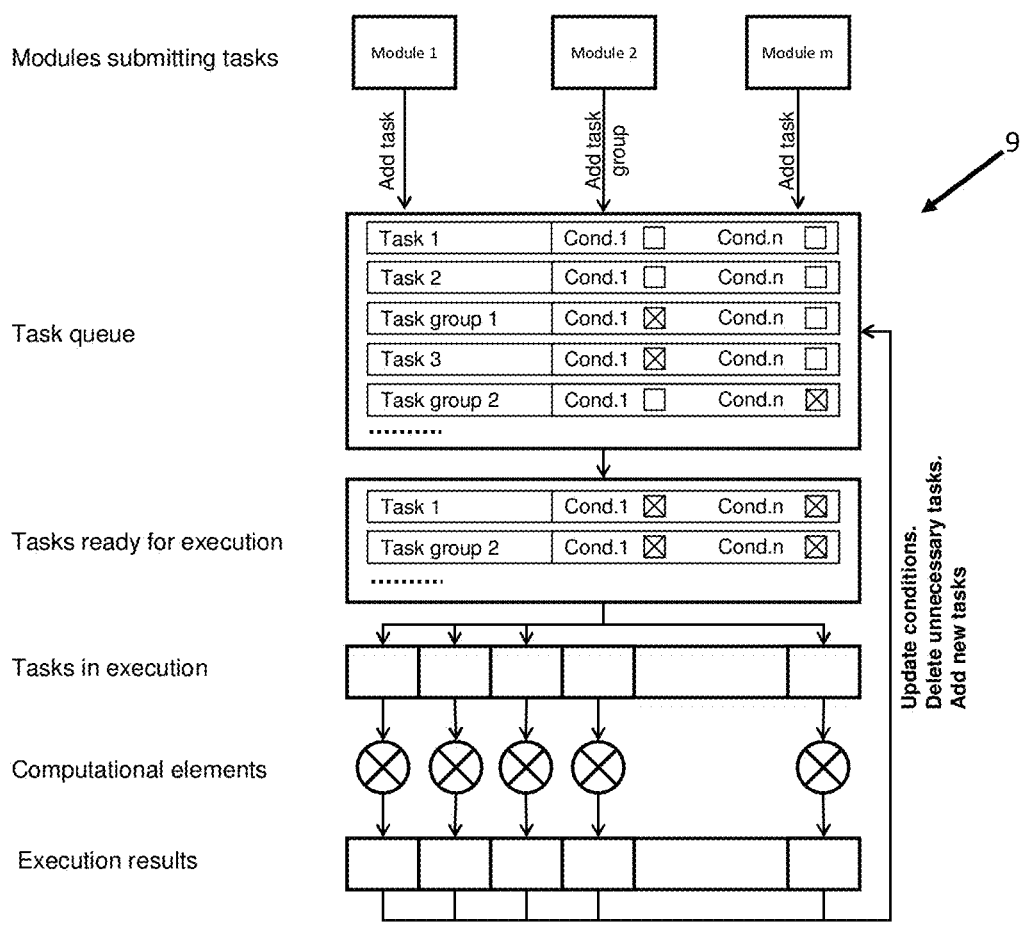
FIG. 22 illustrates a 3D mesh merging operation.

A Parallel Task Scheduler module 9 embodying the present invention, whose layout is shown in FIG. 22, has a multi-layered structure. The module 9 executes units of works called tasks. A task represents the execution of one of the previously described modules, for example running CAD split on the CAD file representing one part of the assembly or the 3D meshing of a section of a part. Each task, besides input data, can have zero, one or more conditions that needs to be satisfied in order for the task to be able to execute. For example, a 3D meshing task will have a dependency on the 2D mesh modification module being executed on the sections of that part.

Tasks are added to the task queue and stay there until all their conditions are satisfied. When this happens, they are moved to another queue containing tasks ready for execution. The scheduler then chooses for execution as many tasks as free processing units, which are then executed on computational elements. After the execution is finished, if the execution is successful, the conditions of the tasks in the tasks queue are updated, so now some new tasks can become ready for execution. Additionally, following a successful execution, new tasks can be added to the queue. For example, following the successful execution of the CAD split module, new tasks corresponding to the 2D meshing, 2D mesh modification, 3D meshing and 3D mesh merging will be added to the queue.

If a task fails to execute correctly (e.g. an error is encountered during meshing), some tasks from the queue might be removed. For example, if the 2D meshing of one section of a part has failed, the 2D meshing operations for all remaining sections from the same part will be removed from the queue. This type of dependency between tasks is defined in the form of a task group, where all tasks added to the group share the same conditions for execution and the failure of one task will cause the failure of the rest. For example, the 2D meshing tasks for all the sections of one part will make one task group. The module 9 keeps a history of tasks that have failed and prioritises, depending on one or more characteristics of the task (for example, type, level, timing, speed and/or complexity), some or all tasks in the group which are more likely to fail. The module 9 may also keep a history of tasks that have succeeded and, depending on one or more characteristics of the task, prioritise some or all tasks in the group which are more likely to succeed.

For example, consider a simple scenario like the meshing of the car model, which has 7 parts, where the parts may be meshed using two different meshing algorithms X and Y. If in the example each part is split into four sections, for parallel meshing, there will be 7×2=14 initial (higher level) tasks to mesh the parts, e.g. "mesh part 1 using algorithm X", . . . "mesh part 7 using algorithm X" and "mesh part 1 using algorithm Y", . . . "mesh part 7 using algorithm Y". Each task generates a number of sub (lower level) tasks, such as "mesh section 1 of part 1 with algorithm X", "mesh section 2 of part 1 with algorithm X" and so on. Preferably the initial tasks, for the parts, are arranged so that the ones that are more likely to succeed have priority since this can save processing time. For example, if the meshing is more likely to succeed using algorithm X, high level meshing tasks using algorithm X are prioritised in the expectation that it will not be necessary to repeat the processing based on algorithm Y and time will thus be saved. In this example, the order of processing the subtasks is arranged such that the ones that are more likely to fail have priority. If the meshing of one section of the part fails, then the entire part has to be re-meshed, so the sooner the "bad" section is found the better. Thus, in this example, depending on a characteristic of the task (in this case, the level of the task), the prioritisation criterion used by the module when deciding whether to prioritise execution of a task is whether the task is more likely to succeed or is more likely to fail than other tasks to be executed.

Although described above as part of a meshing system, modules embodying the present invention may also advantageously be used independently of any other of the modules or in any feasible combination with one or more others of the modules.

Embodiments of the present invention may be implemented in hardware, or as software modules running on one or more processors, or on a combination thereof. That is, those skilled in the art will appreciate that a microprocessor or digital signal processor (DSP) may be used in practice to implement some or all of the functionality described above.

The invention may also be embodied as one or more device or apparatus programs (e.g. computer programs and computer program products) for carrying out part or all of the methods described herein. Such programs embodying the present invention may be stored on computer-readable media, or could, for example, be in the form of one or more signals. Such signals may be data signals downloadable from an Internet website, or provided on a carrier signal, or in any other form.

The invention claimed is:

1. A meshing method for use in a computer-aided design (CAD) or computer-aided engineering (CAE) manufacturing specification system, in which serial meshing processors are used to carry out a decoupled parallel meshing process in respect of all parts of a CAD assembly model specifying a product to be manufactured,
    wherein input parameters for the meshing process are set automatically, for each part to be processed, using live runtime information comprising information about the outcome of previous attempts to carry out the meshing process of the part concerned; and
    wherein a part of the CAD assembly model is split into a desired number DN of sections prior to undergoing the CAD meshing process by corresponding serial meshing processors, the method further comprising the steps of:
        (a) determining (i) the number of split points Nx in an X direction, (ii) the number of split points Ny in a Y direction and (iii) the number of split points Nz in a Z direction, where the X, Y and Z directions are mutually parallel and $(Nx+1)(Ny+1)(Nz+1) \geq DN$;
        (b) recursively bisecting the part in the X direction until (Nx+1) sections are obtained;
        (c) for all sections obtained in step (b), recursively bisecting the sections in the Y direction until (Nx+1)(Ny+1) sections are obtained; and
        (d) for all sections obtained in step (c), recursively bisecting the sections in the Z direction until (Nx+1)(Ny+1)(Nz+1) sections are obtained;
    wherein the memory requirements of the serial meshing processors for carrying out the meshing process are reduced.

2. A method as claimed in claim 1, further comprising modifying a two dimensional (2D) mesh at a surface of a section obtained in a computer-aided design process in which an assembly model which is the subject of the CAD process has been separated into different parts each of which is split into sections which are then subjected to 2D meshing such that each surface of the section is defined by a set of 2D elements produced using a meshing method which generates the same one dimensional (1D) edge mesh at every surface, in which method the modifying comprises:
    allocating all the sections of the part to either a first set or a second set according to the location of the section in the part such that all the sections which have an interface with the sections in the first set are allocated to the second set;
    for each of the sections in the first set, matching nodes of elements along edges of a surface of a section in the first set with nodes of elements along edges of an opposing surface of a section in the second set; and
    replacing the elements on the surface of the first set section with the elements on the surface on the second set section.

3. A non-transitory computer-readable storage medium carrying instructions which, when carried out on a computer, cause that computer to carry out a method as claimed in claim 1.

4. Meshing apparatus for use in a computer-aided design (CAD) or computer-aided engineering (CAE) manufacturing specification system, which apparatus uses serial meshing processors to carry out a decoupled parallel meshing process in respect of all parts of a CAD assembly model specifying a product to be manufactured, the apparatus comprising a first processor to:

set input parameters for the meshing process automatically, for each part to be processed, using live runtime information, comprising information about the outcome of previous attempts to carry out the meshing process of the part concerned, to determine one or more input parameters; and splitting a part of an assembly model specifying a product to be manufactured into a desired number DN of sections prior to meshing of the sections by corresponding serial meshing processors, by carrying out the steps of:

(a) determining (i) the number of split points Nx in an X direction, (ii) the number of split points Ny in a Y direction and (iii) the number of split points Nz in a Z direction, where the X, Y and Z directions are mutually parallel and $(Nx+1)(Ny+1)(Nz+1) \geq DN$;

(b) recursively bisecting the part in the X direction until $(Nx+1)$ sections are obtained;

(c) for all sections obtained in step (b), recursively bisecting the sections in the Y direction until $(Nx+1)(Ny+1)$ sections are obtained; and (d) for all sections obtained in step (c), recursively bisecting the sections in the Z direction until $(Nx+1)(Ny+1)(Nz+1)$ sections are obtained;

wherein the memory requirements of the serial meshing processors for carrying out the meshing process are reduced.

5. Apparatus as claimed in claim 4, wherein the first or another processor carries out the step of modifying a two dimensional (2D) mesh at a surface of a section obtained in a computer-aided design process, where an assembly model which is the subject of the CAD process has been separated into different parts each of which is split into sections which are then subjected to 2D meshing such that each surface of the section is defined by a set of 2D elements produced using a meshing method which generates the same one dimensional (1D) edge mesh at every surface, the second processor carrying out a method in which:

all the sections of the part are allocated to either a first set or a second set according to the location of the section in the part such that all the sections which have an interface with the sections in the first set are allocated to the second set;

for each of the sections in the first set, nodes of elements along edges of a surface of a section in the first set are matched with nodes of elements along edges of an opposing surface of a section in the second set; and the elements on the surface of the first set section are replaced with the elements on the surface on the second set section.

* * * * *